(12) United States Patent
Lee et al.

(10) Patent No.: US 12,519,342 B2
(45) Date of Patent: Jan. 6, 2026

(54) COMPUTING DEVICE COMPONENT ATTACHMENT

(71) Applicant: Microsoft Technology Licensing, LLC, Redmond, WA (US)

(72) Inventors: Jaejin Lee, Redmond, WA (US); Donghwi Kim, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 699 days.

(21) Appl. No.: 18/048,637

(22) Filed: Oct. 21, 2022

(65) Prior Publication Data

US 2024/0136854 A1   Apr. 25, 2024
US 2024/0235260 A9   Jul. 11, 2024

(51) Int. Cl.
| | | |
|---|---|---|
| *H02J 50/00* | (2016.01) | |
| *G06F 1/16* | (2006.01) | |
| *H01F 7/02* | (2006.01) | |
| *H01F 7/06* | (2006.01) | |
| *H02J 7/00* | (2006.01) | |
| *H02J 50/10* | (2016.01) | |
| *H02J 50/20* | (2016.01) | |
| *H02J 50/90* | (2016.01) | |

(52) U.S. Cl.
CPC ............ *H02J 50/005* (2020.01); *G06F 1/162* (2013.01); *G06F 1/1654* (2013.01); *H01F 7/02* (2013.01); *H01F 7/064* (2013.01); *H02J 7/0047* (2013.01); *H02J 7/00712* (2020.01); *H02J 50/10* (2016.02); *H02J 50/20* (2016.02); *H02J 50/90* (2016.02)

(58) Field of Classification Search
CPC ..................................................... H02J 50/005
USPC ............................................................ 320/108
See application file for complete search history.

(56) References Cited

U.S. PATENT DOCUMENTS

2010/0248622 A1*  9/2010  Lyell Kirby ............ H02J 50/90
                                                            455/127.1
2016/0141908 A1   5/2016  Jakl et al.
(Continued)

FOREIGN PATENT DOCUMENTS

| CN | 112269478 A | 1/2021 |
|---|---|---|
| KR | 20220017323 A | 2/2022 |

(Continued)

OTHER PUBLICATIONS

International Search Report and Written Opinion received for PCT Application No. PCT/US23/031935, Jan. 4, 2024, 13 pages.
(Continued)

*Primary Examiner* — Yalkew Fantu
(74) *Attorney, Agent, or Firm* — Alleman Hall & Tuttle LLP

(57) ABSTRACT

A computing device configured to removably attach a component comprises a housing comprising first and second device electromagnets. A wireless charging transmitting antenna is between the electromagnets. Instructions are executable by a processor to synchronize a first device current through the first device electromagnet with a first component current through a first component electromagnet of the component to attract the electromagnets, and to synchronize a second device current through the second device electromagnet with a second component current through a second component electromagnet of the component to attract the electromagnets.

20 Claims, 11 Drawing Sheets

(56) References Cited

U.S. PATENT DOCUMENTS

2017/0187220 A1\* 6/2017 Rosenfeld ............... H02J 50/12
2018/0053588 A1\* 2/2018 Barel .................. G06F 3/04883
2022/0326789 A1 10/2022 Marwah

FOREIGN PATENT DOCUMENTS

WO 2014184610 A1 11/2014
WO 2022030965 A1 2/2022

OTHER PUBLICATIONS

"Application as Filed in U.S. Appl. No. 17/451,444", filed Oct. 19, 2021, 41 Pages.

\* cited by examiner

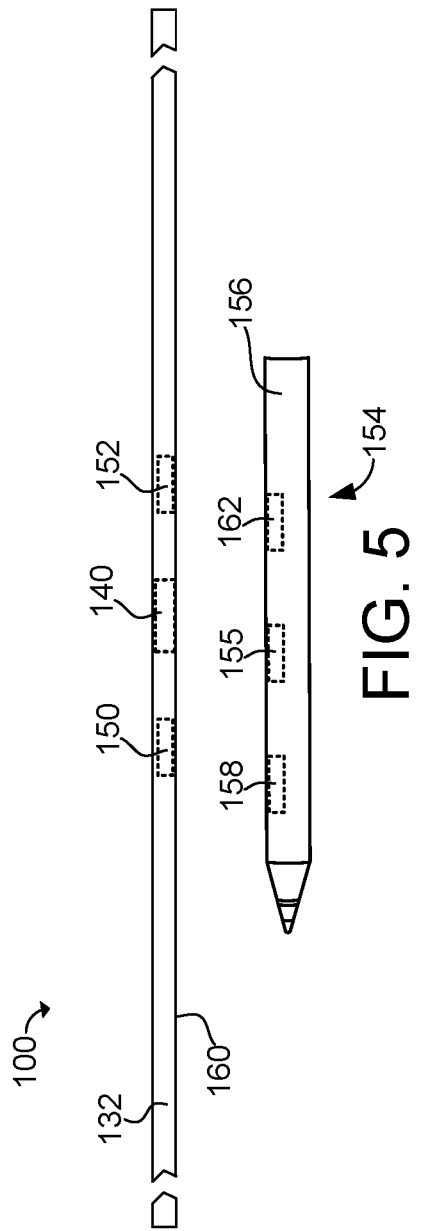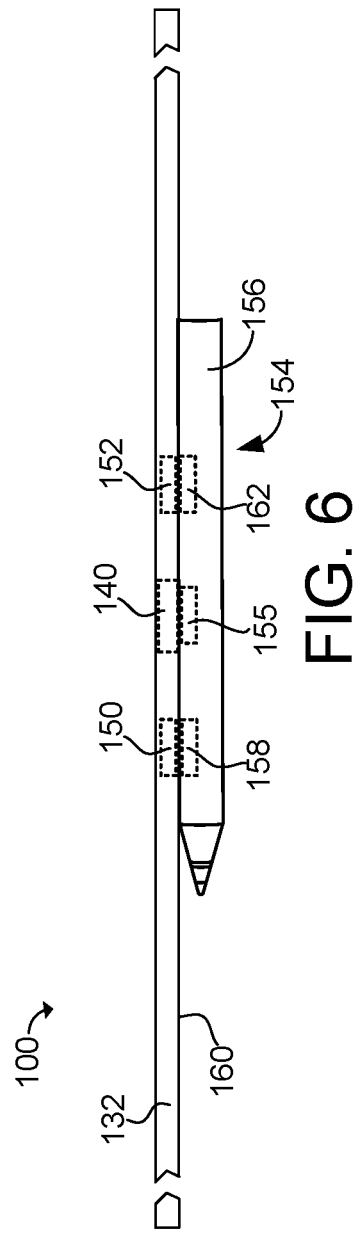

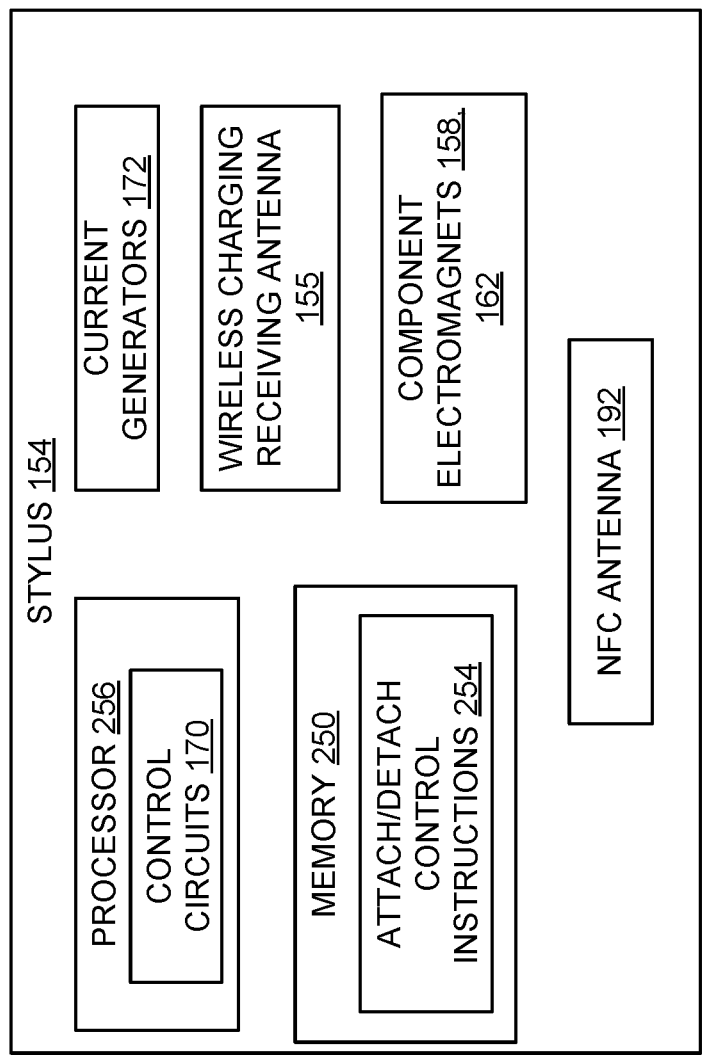
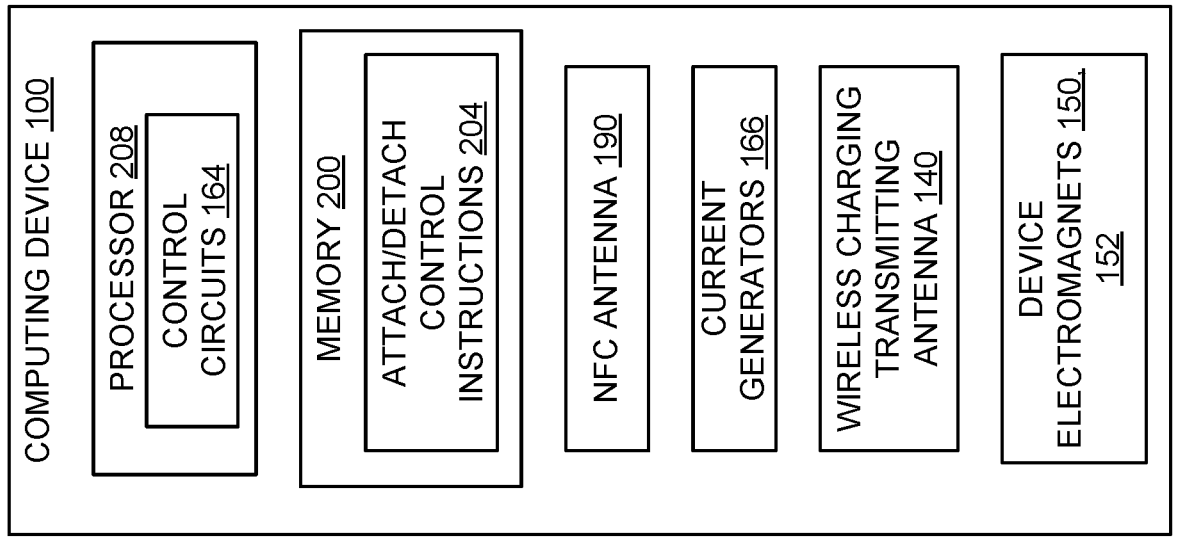
FIG. 10

COMPUTING DEVICE COMPONENT ATTACHMENT

BACKGROUND

Some electronic devices, such as laptop and tablet computers, can be used with one or more external components, such as a stylus, headphones or earbuds. In some examples an electronic device can wirelessly charge the external component.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

As described in more detail below, computing devices and components are configured to synchronize current flows through electromagnets for improved wireless charging and easier attachment and removal of the component from the computing device. In some examples, the computing device comprises a housing comprising a first device electromagnet, a second device electromagnet spaced from the first device electromagnet, and a wireless charging transmitting antenna. The computing device includes a processor and a memory storing instructions executable by the processor to synchronize a first device current through the first device electromagnet of the computing device with a first component current through a first component electromagnet of the component to attract the first device electromagnet to the first component electromagnet. The instructions are also executable to synchronize a second device current through the second device electromagnet of the computing device with a second component current through a second component electromagnet of the component to attract the second device electromagnet to the second component electromagnet.

Advantageously and as described in more detail below, configurations of the present disclosure ensure proper alignment of the wireless charging transmitting antenna of the computing device with a corresponding wireless charging receiving antenna of the component, thereby improving wireless charging efficiencies. Additionally, configurations of the present disclosure enable easier attaching of components to computing devices while also ensuring proper alignment. Additionally, configurations of the present disclosure provide for both secure retention of the component and easier detaching of the component by the user.

BRIEF DESCRIPTION OF THE DRAWINGS

FIG. 5 schematically depicts an end view of the computing device with stylus unattached showing electromagnets and wireless charging components in the stylus and computing device according to examples of the present disclosure.

FIG. 6 shows the stylus attached in the proper charging location on the computing device with wireless charging components aligned according to examples of the present disclosure.

FIG. 10 shows a schematic representation of components of the computing device and stylus according to examples of the present disclosure.

DETAILED DESCRIPTION

Figure 1:
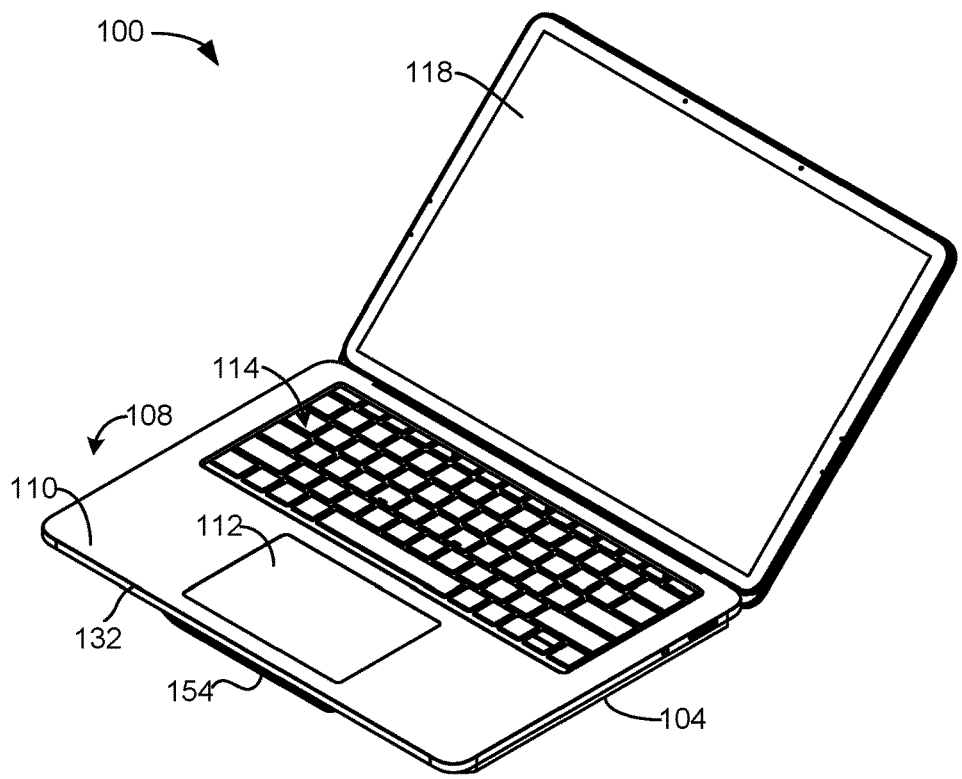
FIGS. 1 and 2 depict an example computing device and stylus according to examples of the present disclosure.

Many different computing devices, such as laptop, tablet, and dual-display computing devices, may be utilized with one or more accessory components, including but not limited to styli, headphones or earbuds, and head-mounted displays or eyeglasses. Some computing devices include wireless charging capabilities that can wirelessly charge components having similar wireless charging functionality. In some examples, both the computing device and the accessory include one or more permanent magnets to magnetically attach the component to the computing device. If the component is attached at the proper location, a receiving antenna in the component can wireless receive power transmitted by the computing device via electromagnetic induction.

However, in many devices the attachment forces generated by permanent magnets in the computing device and the component are insufficient to ensure that the component is attached at the proper location. In these cases, misalignment of the wireless charging transmitting and receiving antennas results in significant losses in charging coupling efficiency. Charging the component in such misaligned positions can also generate significant heat and cause the external temperature of the component to rise to undesirable levels. In other examples where permanent magnets are utilized that generate much stronger attachment forces, while accurate component attachment at the proper location may be achieved, the forces required to detach the component from the computing device are correspondingly increased to levels that can significantly impact user accessibility and make the component difficult and uncomfortable to remove from the computing device.

Accordingly, the present disclosure describes computing devices and related methods that removably attach a component to a computing device in a manner that provides improved alignment of the component with a wireless charging transmitting antenna of the computing device. Advantageously and as described in more detail below, configurations of the present disclosure enable consistently high charging efficiencies while also providing easy user interactions for attaching the component. Additionally, the computing devices and methods of the present disclosure provide the above benefits of component alignment while also selectively reducing the magnetic forces holding the component against the computing device when the user desires to remove the component. Advantageously, these configurations make the component easier to remove by requiring less force to detach the component from the computing device.

FIGS. 1-6 show one example of a computing device configured to removably attach a component according to aspects of the present disclosure. In this example, the computing device is a portable computing device 100 and the component is a stylus 154. It will be understood that computing device and stylus configurations as described herein are presented as nonlimiting examples for illustrative purposes and are schematic in nature. In other examples, a variety of other computing devices and components can utilize aspects of the present disclosure. Non-limiting examples of computing devices that can utilize aspects of the present disclosure include laptops, notebooks, tablets, dual-display computing devices, and wearable computing devices. Non-limiting examples of components that can utilize aspects of the present disclosure include styli, mice and other pointing devices, headphones or earbuds, and head-mounted displays or eyeglasses. As such, other computing device and component configurations contemplated by this disclosure can have a variety shapes, sizes, dimensions, and form factors.

Figure 2:
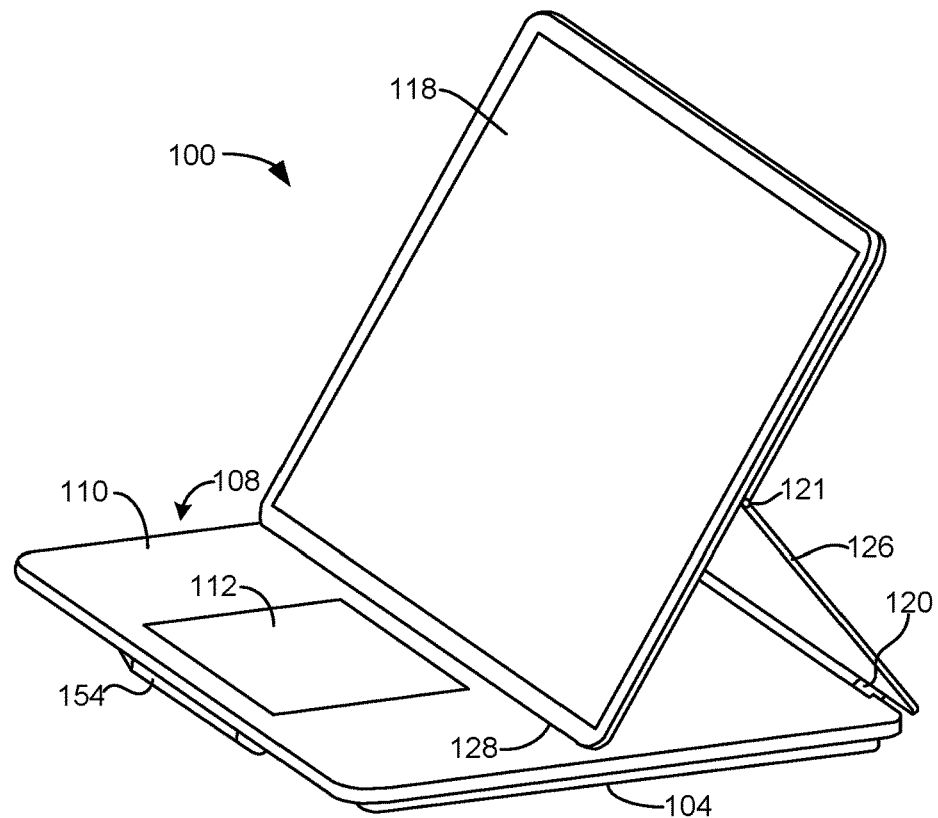
Figure 3:
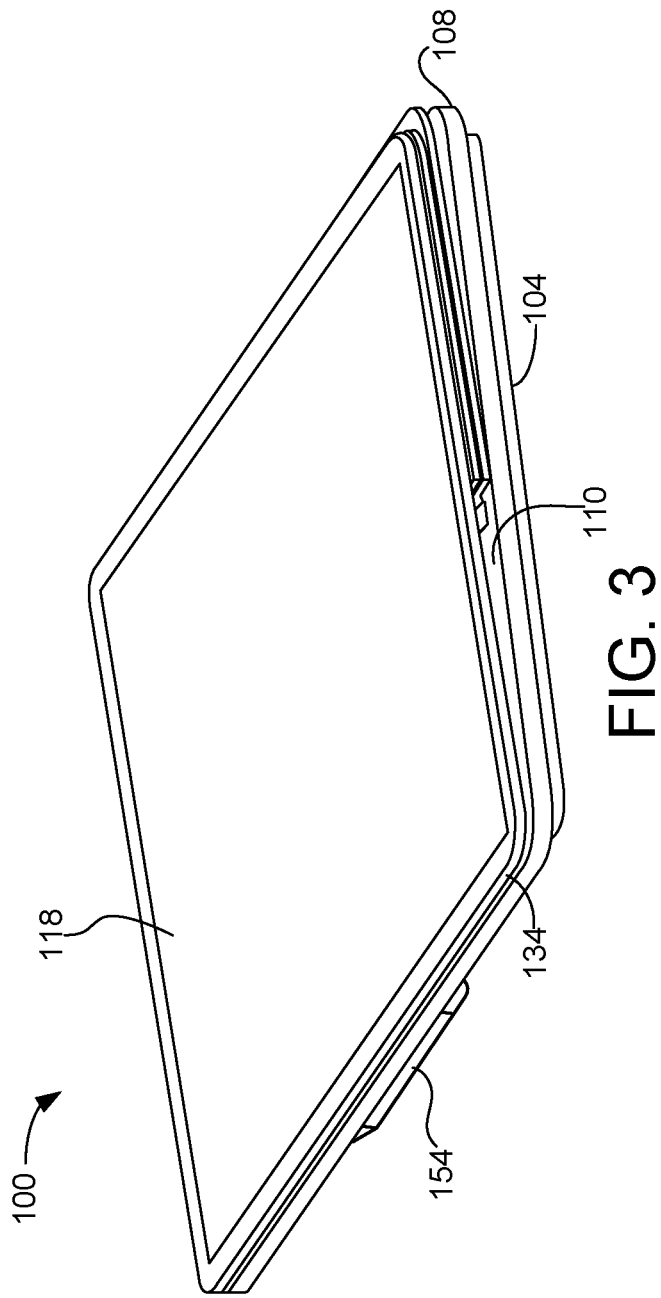
FIG. 3 depicts the example computing device of FIG. 1 in a tablet mode according to examples of the present disclosure.

With reference to FIGS. 1-2, computing device 100 includes a base 104 and an adjoining housing 108. In some examples, the base 104 and housing 108 may be separately fabricated enclosures that are affixed together. In other examples, the base 104 and housing 108 may be integrally formed as a single enclosure. The housing 108 is positioned above the base 104 and includes a planar user interactive surface 110 comprising a trackpad 112 and a keyboard 114. As shown in FIG. 3, the display 118 also may be positioned in a tablet mode in which the display rests generally parallel to the user interactive surface 110 and housing 108 to create a tablet-like user experience.

In this example, computing device 100 includes a touch-sensitive display 118 that is rotatably coupled to housing 108 via a display positioning assembly comprising hinges 120 and 121. A collapsible support member 126 is rotatably connected to the housing 108 at hinge 120. The bottom edge 128 of display 118 is not rigidly affixed to the user interactive surface 110 of the housing 108. Rather, the bottom edge 128 of display 118 is moveable to any of a range of securable display positions along the user interactive surface 110. Additional details regarding the components and computing aspects of computing device 100 are described in more detail below with reference to FIG. 10 and the example computing system of FIG. 12.

Figure 4:
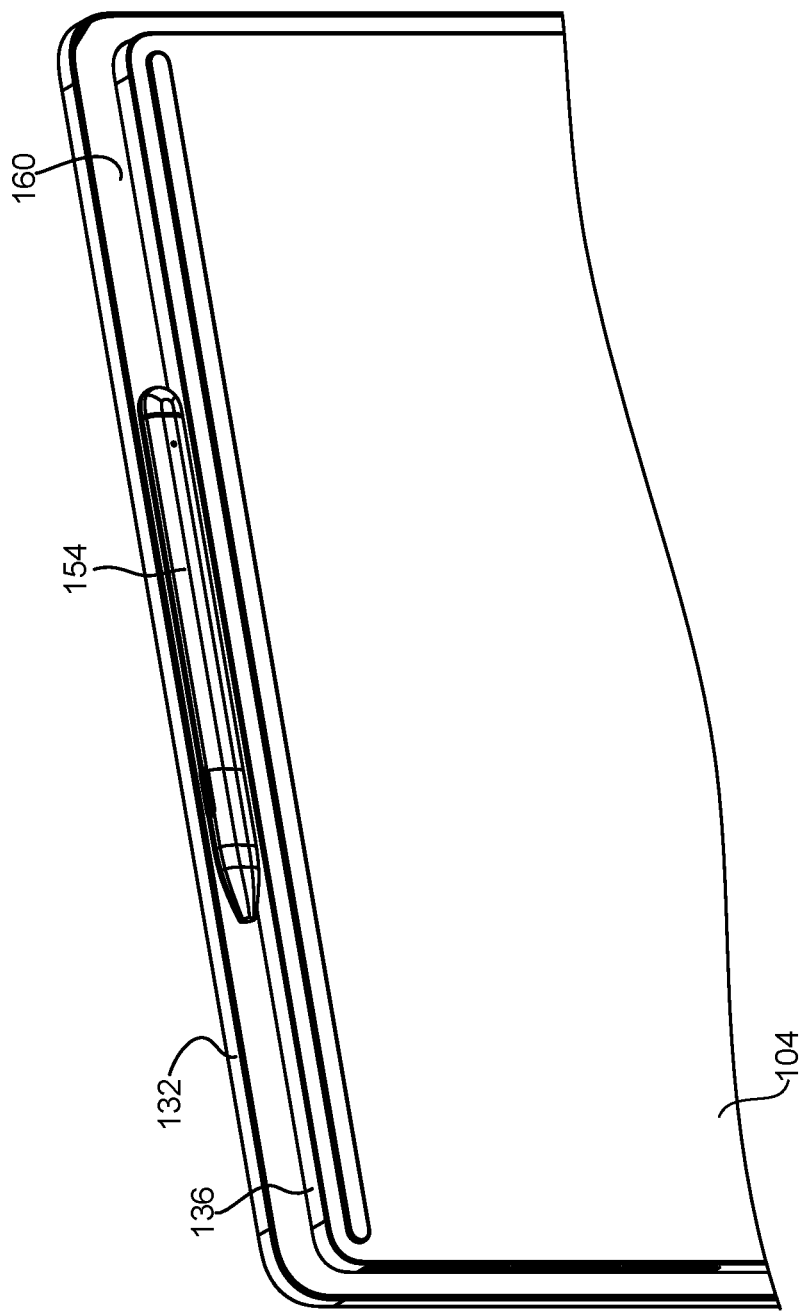
FIG. 4 shows a partial bottom view of the computing device of FIG. 1 with stylus attached according to examples of the present disclosure.

With reference to FIGS. 4 and 5 and as described in more detail below, the housing 108 of computing device 100 includes an overhanging brim 132 that comprises device electromagnets configured to removably retain the stylus 154 underneath the overhanging brim. In this example, the overhanging brim 132 extends beyond a front wall 136 of the base 104 and comprises a first device electromagnet 150 and second device electromagnet 152 spaced from the first device electromagnet. The first and second device electromagnets 150, 152 are configured to be selectively synchronized with corresponding electromagnets in the stylus 154 to removably retain the stylus 154 and allow for easy and convenient detachment of the stylus from underneath the overhanging brim 132 as described further below. Between the two device electromagnets 150, 152 is a wireless charging transmitting antenna 140 configured to provide wireless charging of the stylus 154 when it is magnetically retained against the planar ceiling 160 of the overhanging brim 132 by the device electromagnets 150, 152.

As shown in FIGS. 5 and 6, the stylus 154 comprises an enclosure 156 that includes a first component electromagnet 158 and a second component electromagnet 162 spaced from the first device electromagnet. A wireless charging receiving antenna 155 is located between the first and second component electromagnets 158, 162 to enable convenient charging of the stylus when it is secured against the planar ceiling 160 and the wireless charging receiving antenna is aligned with the wireless charging transmitting antenna 140, as shown in FIG. 6.

As described in more detail below, and in one potential advantage of the present configurations, the electromagnets in the computing device 100 and stylus 154 are selectively synchronized to provide improved alignment of the wireless charging receiving antenna 155 of the stylus 154 with the wireless charging transmitting antenna 140 of the computing device 100 when the stylus is removably attached to the computing device. More particularly, in some examples current flows through the electromagnets of the computing device 100 and stylus 154 are selectively synchronized in a manner that attracts the stylus to the computing device and aligns the wireless charging receiving antenna 155 with the wireless charging transmitting antenna 140. Advantageously, providing such improved alignment enables consistently high charging efficiencies while also providing easy user interactions for attaching the component.

Additionally, when the user desires to remove the stylus 154, these configurations also selectively reduce the magnetic forces holding the stylus against the computing device 100 to make the stylus easier to remove. More particularly, in some examples current flows through the electromagnets of the computing device 100 and stylus 154 are synchronized in a manner that creates a repelling force that urges the stylus 154 away from the computing device. Advantageously, providing such a repelling force enables users to more easily detach the stylus 154 from the computing device.

Figure 7:
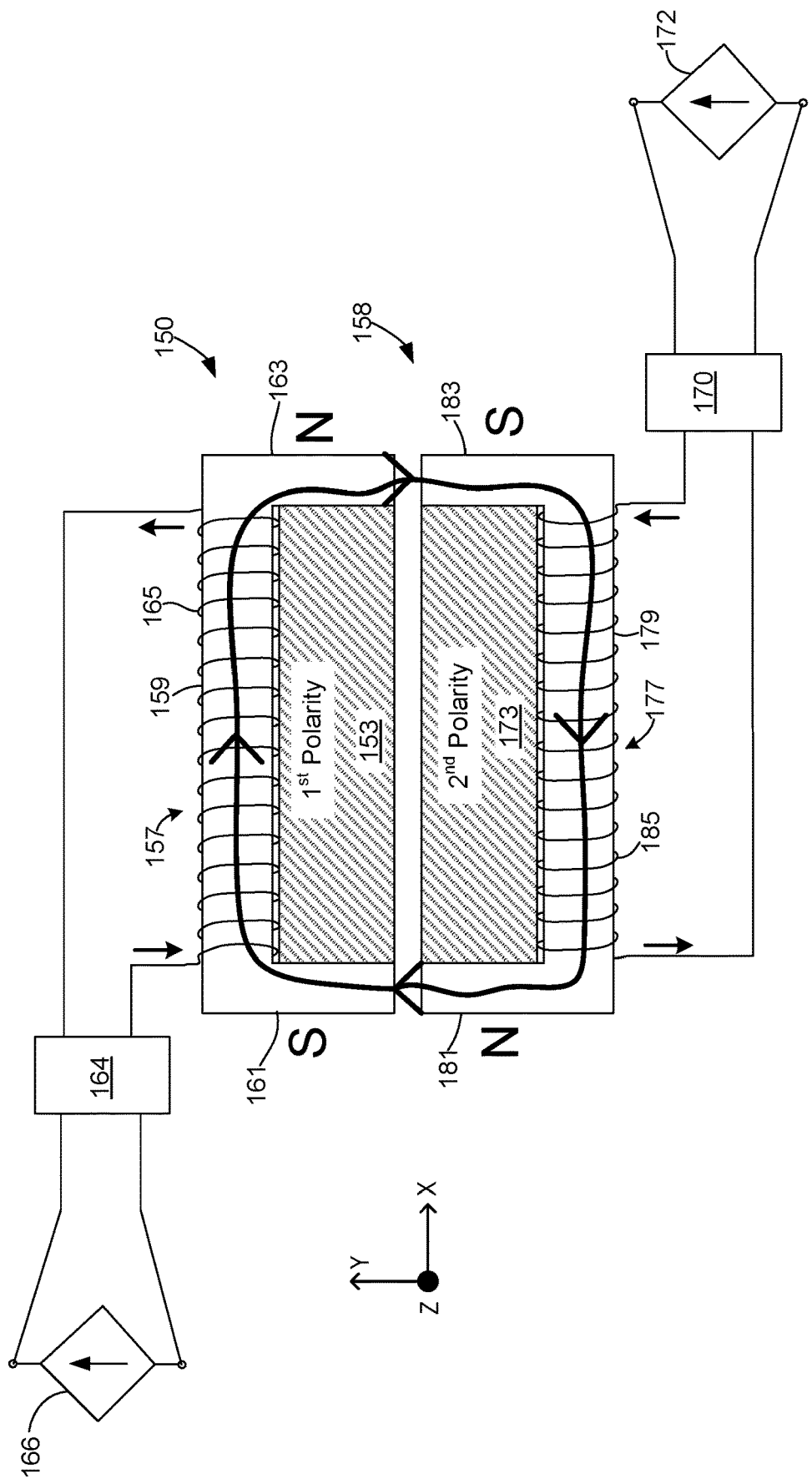
FIG. 7 shows a first device electromagnet and a first component electromagnet synchronized to attract one another according to examples of the present disclosure.

With reference to FIGS. 7 and 10, in some examples the computing device 100 and stylus 154 each include control circuits that control the device electromagnets and component electromagnets. As described in more detail below, FIG. 7 shows a representation of one example configuration of the first device electromagnet 150 in the computing device 100 and the first component electromagnet 158 in the stylus 154, with the stylus removably attached to the computing device 100 as shown in FIG. 6. In this example and as described further below, a device control circuit 164 in the computing device 100 includes a switch that controls current flow direction into the first device electromagnet 150 from a device current generator 166. In some examples the switch is implemented as a H-bridge circuit that controls the direction of current flowing into the first device electromagnet 150.

Similarly, in the stylus 154 a component control circuit 170 includes a switch that controls current flow into the first component electromagnet 158 from a component current generator 172. Additionally, in this example the second device electromagnet 152 in the computing device 100 and the second component electromagnet 162 in the stylus 154 have the same configurations.

With reference also to FIG. 10 and as described further below, in some examples the computing device 100 includes a memory 200 storing attach/detach control instructions 204 that are executable by the processor 208 to selectively energize the device electromagnets and the component electromagnets to attract or repel one another. More particularly, when the computing device 100 determines that the user intends to attach the stylus 154 to the device, the device executes the attach/detach control instructions 204 to synchronize a first device current flowing through the first device electromagnet 150 of the computing device 100 with a first component current flowing through the first component electromagnet 158 of the stylus 154 in a manner that attracts the first device electromagnet to the first component electromagnet. Similarly, a second device current through the second device electromagnet 152 of the computing device 100 is synchronized with a second component current through the second component electromagnet 162 of the stylus 154 to attract the second device electromagnet to the second component electromagnet. Additionally and as described further below, when the computing device 100 determines that the user intends to remove the stylus 154 from the device, the attach/detach control instructions 204 are configured to selectively reverse the current flows through one or more of the electromagnets to create a repelling force that enables the user to easily detach the stylus.

In some examples, the computing device controls the current flows in the first and second device electromagnets 150, 152 of the computing device 100 and in the first and second component electromagnets 158, 162 of the stylus 154 to synchronize the current flows as described herein. In other examples, the stylus 154 controls the current flows in its first and second component electromagnets 158, 162 via attach/detach control instructions 254 stored in memory 250 and executable by a processor 256 of the stylus. Additional details and use case descriptions of synchronizing the current flows in the different electromagnets to attract and repel the stylus 154 and computing device 100 are provided below.

With reference again to FIG. 7 and as described in more detail below, the computing device 100 and stylus 154 utilize electromagnet configurations that provide particular advantages and unique capabilities as compared to prior designs. More particularly and as shown in the example of FIG. 7, the first device electromagnet 150 comprises an elongated permanent magnet 153 and a U-shaped soft magnet 157. The soft magnet 157 comprises an elongated body 159, a first end portion 161 extending from the body, and a second end portion 163 spaced from the first end portion to form a U-shaped structure that partially encloses the permanent magnet 153. A coil 165 winds around the elongated body 159 of the soft magnet 157 and extends in a direction parallel to the longitudinal axis of the permanent magnet 153. For ease of illustration coil 165 is shown with 16 turns. In other examples, coil 165 has a higher number of turns, such as 100, 200, or more turns. As noted above, the second device electromagnet 152 has the same configuration as the first device electromagnet 150.

In different examples the elongated permanent magnet 153 is fabricated from neodymium, samarium-cobalt, or any other suitable ferromagnetic material. In different examples the U-shaped soft magnet 157 is fabricated from ferrite, iron, NiFe, or any other suitable high-permeability material. In one potential advantage of the present disclosure, by configuring the high-permeability soft magnet 157 in a U-shape configuration that partially surrounds the permanent magnet 153, and by orienting the coil 165 to extend parallel to the longitudinal axis of the permanent magnet 153, the first device electromagnet 150 guides the generated magnetic field to flow along and through the U-shape of the soft magnet 157 and generate a strong magnetic field that attracts or repels the first component electromagnet 158.

Similarly, the first component electromagnet 158 comprises an elongated permanent magnet 173 and a U-shaped soft magnet 177. The soft magnet 177 comprises an elongated body 179, a first end portion 181 extending from the body, and a second end portion 183 spaced from the first end portion to form a U-shaped structure that partially encloses the permanent magnet 173. A coil 185 winds around the elongated body 179 of the soft magnet 177 and extends in a direction parallel to the longitudinal axis of the permanent magnet 173. In this example, the second component electromagnet 162 has the same configuration as the first component electromagnet 158.

Advantageously, this configuration of the first device electromagnet 150 and first component electromagnet 158 (along with the second device electromagnet 152 and the second component electromagnet 162) enables the computing device 100 and stylus 154 to selectively generate strong magnetic forces that cooperate to properly align the wireless charging transmitting antenna 140 in the computing device with the wireless receiving antenna 155 in the stylus when the user is attempting to attach the stylus to the computing device. As described further below, when the user desires to detach the stylus 154 from the computing device 100, this configuration also enables the corresponding device and component electromagnets to repel one another to reduce the forces required by the user to remove the stylus, thereby improving stylus accessibility.

Figure 8:
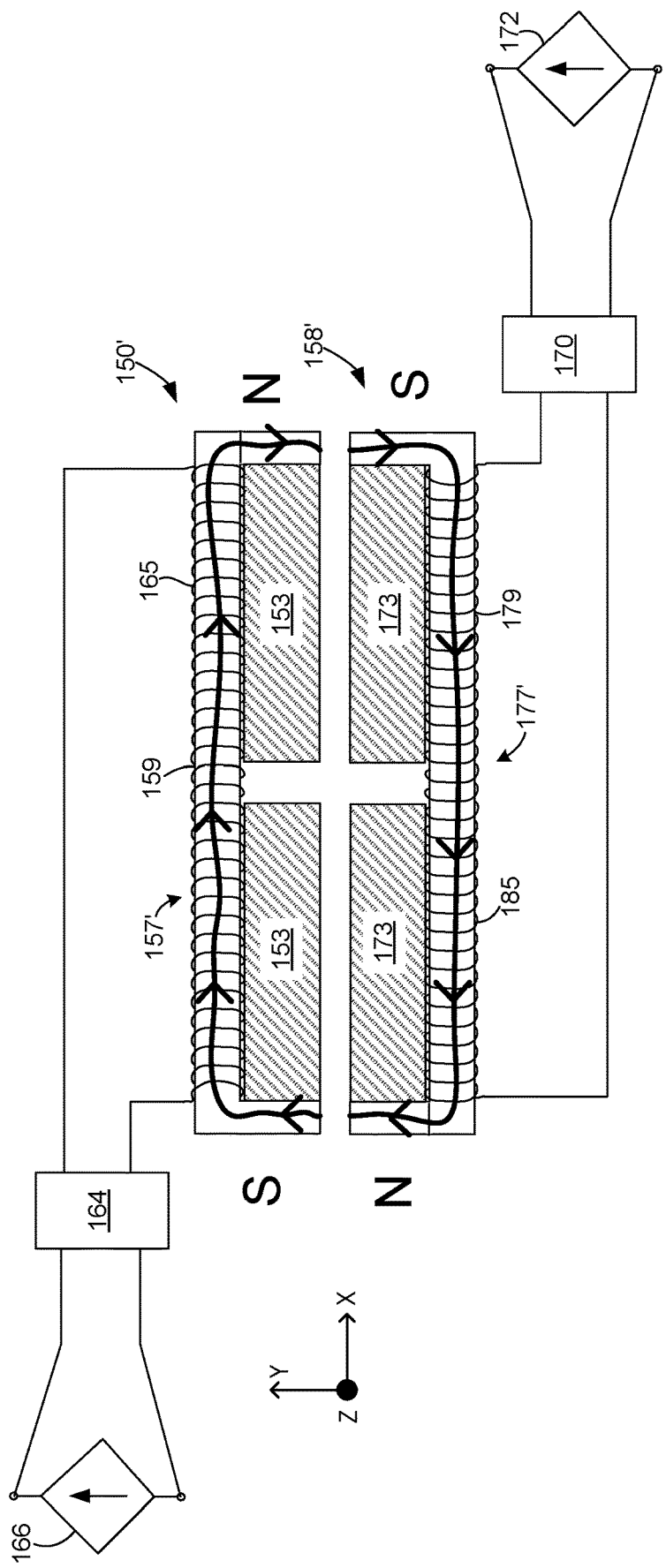
FIG. 8 shows an example of the first device electromagnet and first component electromagnet utilizing multiple permanent magnets according to examples of the present disclosure.

Additionally, and in another potential advantage of the present disclosure, this configuration of electromagnet also enables the addition of one or more supplemental permanent magnets to increase the strength of the generated magnetic forces, while still utilizing a single control circuit and coil for the expanded electromagnet. In one example and with reference now to FIG. 8, a plurality of permanent magnets 153 and permanent magnets 173 are arranged end-to-end in configurations of a first device electromagnet 150' and a first component electromagnet 158', respectively. The soft magnets 157' and 177' in both the first device electromagnet 150' and the first component electromagnet 158' have a U-shaped structure as described above that partially encloses their respective permanent magnets 153 and 173.

Additionally, in the first device electromagnet 150' a single coil 165 winds around the elongated body 159 of the soft magnet and extends adjacent to the plurality of elongated permanent magnets 153. Similarly, in the first component electromagnet 158' a single coil 185 winds around the elongated body 179 of the soft magnet and extends adjacent to the plurality of elongated permanent magnets 153. Accordingly, and in another potential advantage of this configuration, because each electromagnet utilizes a single coil that extends along the plurality of elongated permanent magnets, a single control circuit is utilized to control the current flow. Further, with these configurations additional permanent magnets can be easily added end-to-end while still utilizing a single control circuit. Advantageously, these configurations can be easily expanded with additional permanent magnets to increase the forces generated by the electromagnet, such as for heavier and/or larger components, while still utilizing a single control circuit and avoiding the added complexity, packaging space, and cost of including additional control circuits.

Figure 11A:
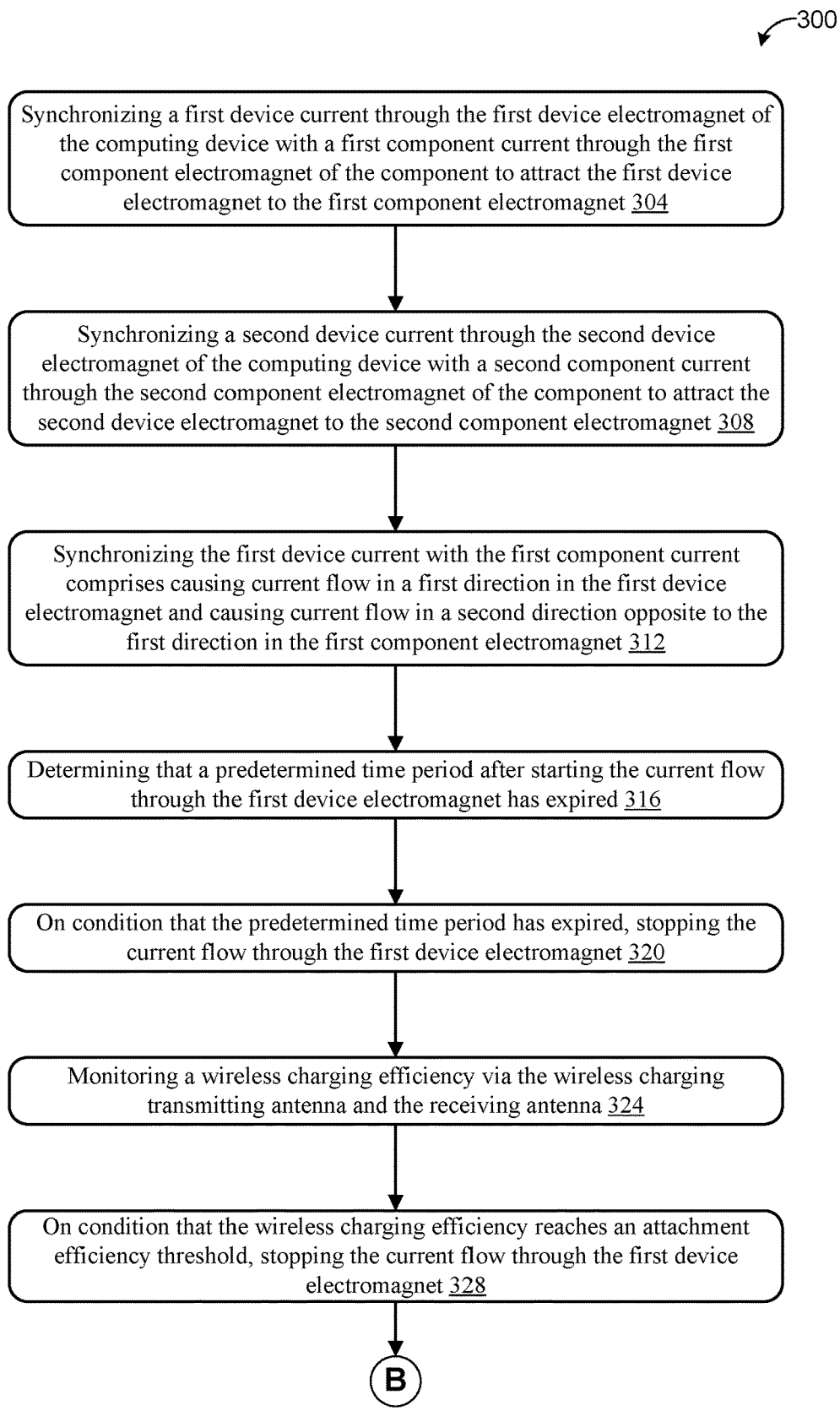
FIGS. 11A and 11B illustrate an example method of removably attaching a component to a computing device according to examples of the present disclosure.
Figure 11B:
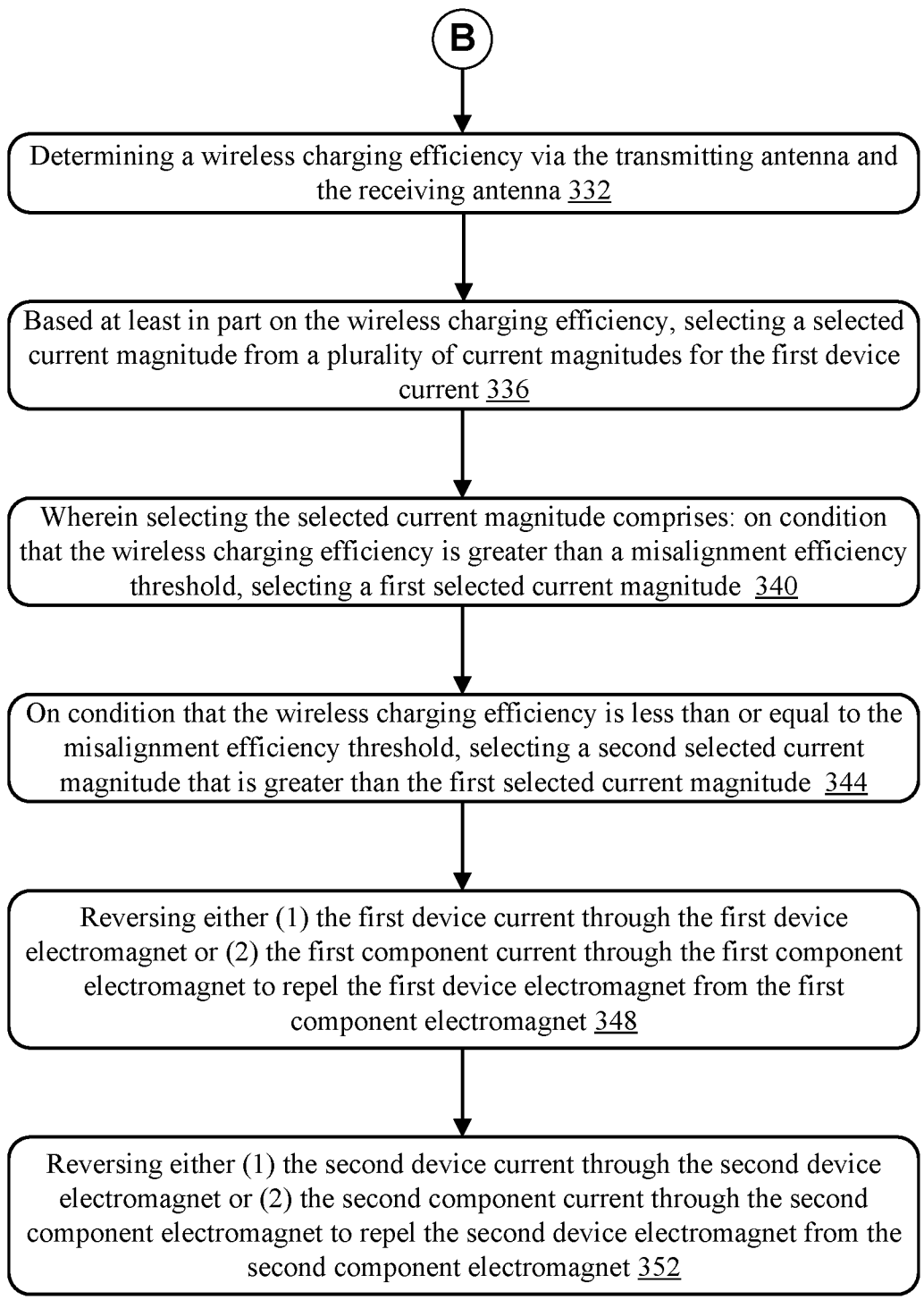

With reference now to FIGS. 11A and 11B, an example method 300 of removably attaching a component to a computing device is provided. Method 300 may be implemented using the example configurations of computing device 100 and stylus 154 as described above and other configurations as contemplated by the present disclosure. The following description of method 300 is provided with reference to the computing devices and components described herein and shown in FIGS. 1-10 and 12.

It will be appreciated that the following description of method 300 is provided by way of example and is not meant to be limiting. Therefore, it is to be understood that method 300 may include additional and/or alternative steps relative to those illustrated in FIGS. 11A and 11B. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

As noted above, in some examples when the computing device 100 determines that the user intends to attach the stylus 154 to the device, the device synchronizes the current flows through the device and stylus electromagnets in a manner that attracts the device and stylus electromagnets to one another as described further below. In some examples, the computing device 100 includes one or more presence sensors to detect the presence of the stylus 154 near the wireless charging transmitting antenna 140. In the present example, the computing device 100 and stylus 154 each include near-field communication (NFC) antennas 190, 192, respectively (see FIG. 10), that enable the computing device to detect when the stylus is near the wireless charging transmitting antenna 140. In other examples, any other suitable sensors, such as electrostatic voltage sensors, can be utilized.

With reference now to FIG. 11A, in some examples when the computing device 100 detects the presence of the stylus 154, at 304 the method 300 includes synchronizing a first device current through the first device electromagnet 150 of the computing device with a first component current through the first component electromagnet 158 of the stylus 154 to attract the first device electromagnet to the first component electromagnet. Similarly, at 308 the method 300 includes synchronizing a second device current through the second device electromagnet 152 of the computing device 100 with a second component current through the second component electromagnet 162 of the stylus 154 to attract the second device electromagnet to the second component electromagnet.

At 312 the method 300 includes synchronizing the first device current with the first component current by causing current flow in a first direction in the first device electromagnet 150 and causing current flow in a second direction opposite to the first direction in the first component electromagnet 158. In one example and with reference again to FIG. 7, the device control circuit 164 causes current flow through the coil 165 in the positive x-axis direction, and the component control circuit 170 causes current flow through the coil 185 in the opposite, negative x-axis direction. In this manner, the polarities of the two generated magnetic fields are in-phase to cause strong attracting forces that urge the stylus into contact with the planar ceiling 160 of the overhanging brim 132. With reference again to FIGS. 5 and 6, current flows in the second device electromagnet 152 and the second component electromagnet 162 are similarly synchronized to cause strong attracting forces.

Accordingly, and in one potential advantage of the present disclosure and as depicted in FIG. 6, by synchronizing the current flows in the device electromagnets and the component electromagnets to generate strong attracting magnetic forces when the stylus is near the wireless charging transmitting antenna 140, the electromagnets are selectively controlled to properly align the wireless charging transmitting antenna with the wireless receiving antenna 155 in the stylus 154. Advantageously, this configuration ensures proper charging antenna alignment and corresponding maximum charge coupling efficiency for fast charging of the stylus and avoidance of excess heat buildup. Further, this configuration allows for a larger range of misaligned initial placements of the stylus, because the strong electromagnet attraction forces will then adjust the initial placement to the proper alignment. In this manner, user accessibility is also improved by providing a wider range of potential initial placement positions that will still result in proper alignment.

As noted above, in some examples the computing device 100 controls and synchronizes the current flows via control circuits 164, 170 to selectively energize the device electromagnets and the component electromagnets to attract or repel one another. In other examples, the stylus 154 controls the current flows in its first and second component electromagnets 158, 162 via component control circuit 170. In these various examples, the computing device 100 and stylus communicate via any suitable communication subsystem. Examples include, but are not limited to, electrostatic voltage sensors, Bluetooth transceivers, and NFC peer-to-peer systems.

In another potential advantage of the present disclosure, when the stylus 154 is attached and properly aligned with the wireless charging transmitting antenna 140, in different examples the computing device 100 or the stylus 104 stops current flow through the device and component electromagnets. In one example and returning to FIG. 11A, at 316 the method 300 includes determining that a predetermined time period after starting the current flow through the first device electromagnet has expired. Example predetermined time periods include, but are not limited to, 0.5 seconds, 1.0 seconds, or any other suitable predetermined time period. At 320 the method 300 includes, on condition that predetermined time period has expired, stopping the current flow through the first device electromagnet. The same process is also used to stop current flow through the other device electromagnet(s) and the component electromagnets.

Advantageously in these examples, the device and component electromagnets are energized and synchronized for a short period of time to ensure that the stylus is properly aligned with the wireless charging transmitting antenna 140. Additionally, by stopping the current flow to the electromagnets after the time period expires, these configurations conserve power and can extend battery life of the computing device 100 and stylus 154. It will also be appreciated that after the current flow is stopped, the stylus 154 is maintained in the proper charging position by the opposing polarities and corresponding attractive forces between the permanent magnets 153 of the first and second device electromagnets 150, 152 and the permanent magnets 173 of the first and second component electromagnets 158, 162, respectively.

In another example of stopping current flow when the stylus 154 is properly aligned with the wireless charging transmitting antenna 140, the wireless charging efficiency is monitored to determine when a threshold is met that indicates proper alignment. In one example, at 324 the method 300 includes monitoring a wireless charging efficiency via the wireless charging transmitting antenna and the wireless charging receiving antenna. At 328 the method 300 includes, on condition that the wireless charging efficiency reaches an attachment efficiency threshold, stopping the current flow through the first device electromagnet. The same process is also used to stop current flow through the other device electromagnet(s) and the component electromagnets.

Example attachment efficiency thresholds include, but are not limited to, 95%, 96%, 97%, and any other suitable charging efficiency. In some examples, the computing device 100 monitors wireless charging current and/or voltage output from the computing device 100 and received at the stylus 154 via the wireless charging transmitting and receiving antennas to determine the wireless charging efficiencies. Advantageously, in these examples the device and component electromagnets remain energized and synchronized until the actual wireless charging efficiency reaches the desired threshold, thereby ensuring proper alignment of the stylus 154 and high efficiency charging of the stylus. Further and as noted above, by stopping the current flow to the electromagnets when the attachment efficiency threshold is reached, these configurations conserve power and can extend battery life of the computing device 100 and stylus 154.

In other examples, the wireless charging efficiency is used to select and adjust the magnitude of attractive forces between the device and component electromagnets. For example and with reference now to FIG. 11B, at 332 the method 300 includes determining a wireless charging efficiency via the wireless charging transmitting antenna and the wireless charging receiving antenna. At 336 the method 300 includes, based at least in part on the wireless charging efficiency, selecting a selected current magnitude from a plurality of current magnitudes for the first device current.

In one example, two different magnitudes of current flow through the device and component electromagnets are utilized and selected based on the severity of misalignment of the stylus 154 and corresponding levels of wireless charging efficiency. Based at least on the determined wireless charging efficiency, one of the two magnitudes of current flow is selected and utilized with the electromagnets. Any suitable magnitudes of current can be utilized depending upon the size, capacities, and other considerations of the electromagnets, the computing device, and the stylus or other component. In one example for an electromagnet having a coil with 200 turns, magnitudes of 3 amps and 5 amps can be utilized.

In some examples and with reference again to FIG. 11B, at 340 the method 300 includes, on condition that the wireless charging efficiency is greater than a misalignment efficiency threshold, selecting a first selected current magnitude. And at 344 the method 300 includes, on condition that the wireless charging efficiency is less than or equal to the misalignment efficiency threshold, selecting a second selected current magnitude that is greater than the first selected current magnitude.

In one example, the misalignment efficiency threshold is 90%. In this example, a user may place the stylus 154 very close to the proper charging position, such as approximately 2 mm from the proper charging position. In this initial location the computing device 100 determines that the wireless charging efficiency is 94%. Accordingly, because the actual charging efficiency is greater than the misalignment efficiency threshold of 90%, the computing device 100 selects a first selected current magnitude, such as 3 amps, for the current delivered to at least the first device electromagnet 150 and the second device electromagnet 152. In some examples, the first selected current magnitude is also delivered to the first component electromagnet 158 and the second component electromagnet 162.

In another example, the user places the stylus 154 further away from the proper charging position, such as approximately 30 mm from the proper charging position. In this location the computing device 100 determines that the wireless charging efficiency is 65%. Accordingly, because the actual charging efficiency is less than or equal to the misalignment efficiency threshold of 90%, the computing device 100 selects a second selected current magnitude, such as 5 amps, that is greater than the first selected current magnitude for the current delivered to at least the first device electromagnet 150 and the second device electromagnet 152. In some examples the second selected current magnitude is also delivered to the first component electromagnet 158 and the second component electromagnet 162.

Advantageously, in these examples a lower current magnitude is utilized when the user's initial placement of the stylus 154 is close to the proper charging position, thereby conserving power resources and providing a gentler movement of the stylus into the proper position. Additionally and in another potential advantage of these configurations, when the user's initial placement of the stylus 154 is further misaligned from the proper charging position resulting in greater charging inefficiencies, a higher current magnitude is utilized to provide sufficient attractive forces that ensure the stylus is moved into the proper position.

As noted above, in some examples the device and stylus electromagnets are controlled to repel one another to reduce the attractive force holding the stylus 154 against the computing device 100 via the permanent magnets. Advantageously, this reduces the forces required by the user to remove the stylus 154, thereby improving accessibility and ease of use. In one example and with reference again to FIG. 11B, at 348 the method 300 includes reversing either (1) the first device current through the first device electromagnet or (2) the first component current through the first component electromagnet to repel the first device electromagnet from the first component electromagnet. At 352 the method 300 also includes reversing either (1) the second device current through the second device electromagnet or (2) the second component current through the second component electromagnet to repel the second device electromagnet from the second component electromagnet.

Figure 9:
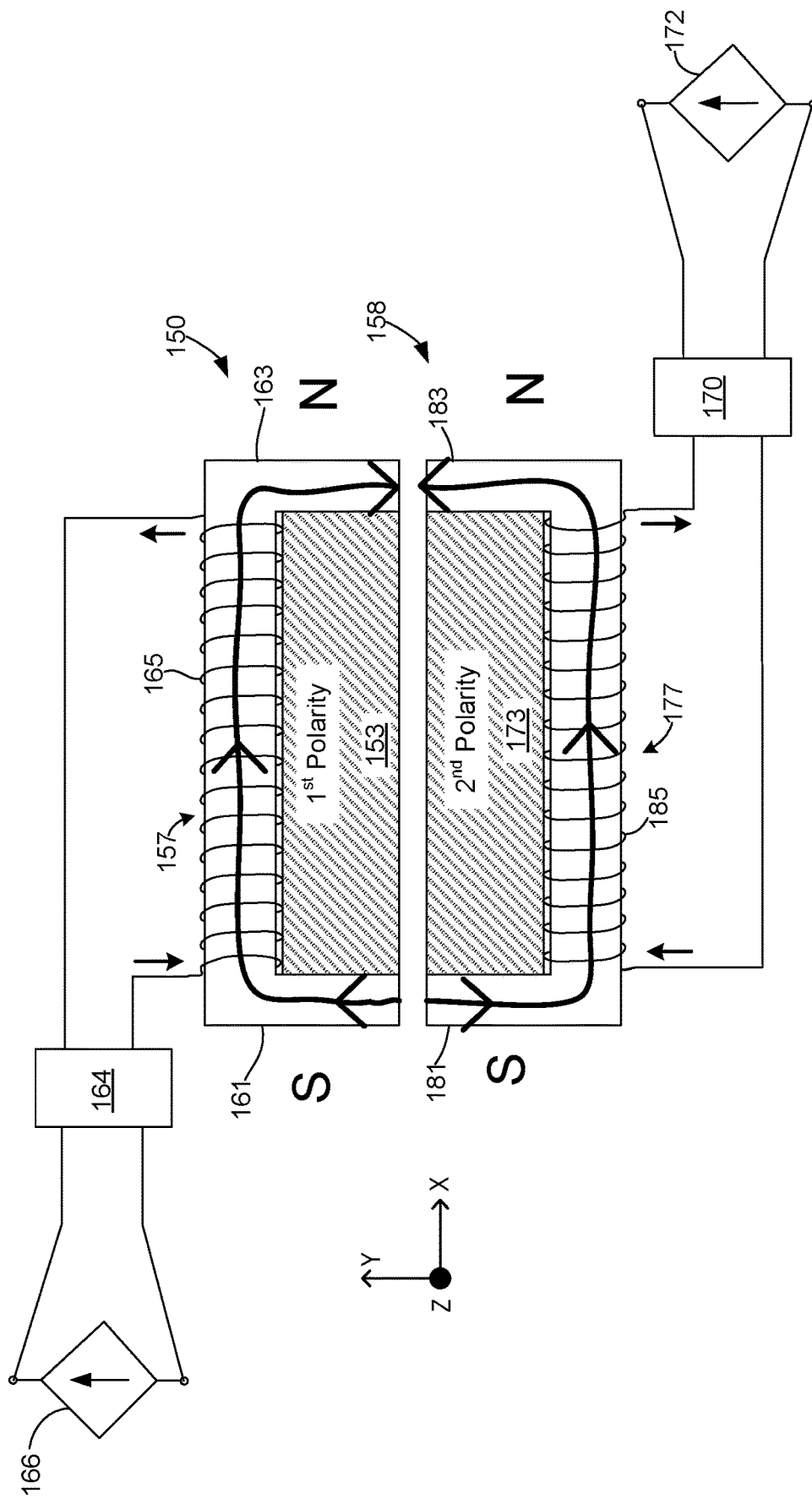
FIG. 9 shows the first device electromagnet and first component electromagnet of FIG. 7 synchronized to repel one another according to examples of the present disclosure.

For example and with reference to FIG. 9, in this example the current flow through the coil 185 of the first component electromagnet 158 is reversed to flow in the positive x-axis direction as compared to the current flow for this electromagnet as shown in FIG. 7, while the direction of current flow through the coil 165 of the first device electromagnet 150 remains unchanged from FIG. 7. Accordingly and as depicted in FIG. 9, the first device electromagnet 150 and first component electromagnet 158 generate out-of-phase magnetic fields that repel one another, and thereby reduce the attractive force provided by the permanent magnets 153, 173.

In some examples, the device and stylus electromagnets are controlled to repel one another upon detection of a trigger condition indicating that the user intends to remove the stylus 154 from attachment to the computing device 100. In one example, the stylus 154 includes touch detection sensors that detect contact by a user's finger(s). When such contact is detected and communicated to computing device 100, the computing device determines that the trigger condition is satisfied and proceeds to control the device and stylus electromagnets to generate repelling forces as described above. In other examples, other components and/ or trigger conditions are utilized to determine that the user intends to remove the stylus 154 from the computing device 100.

Figure 12:
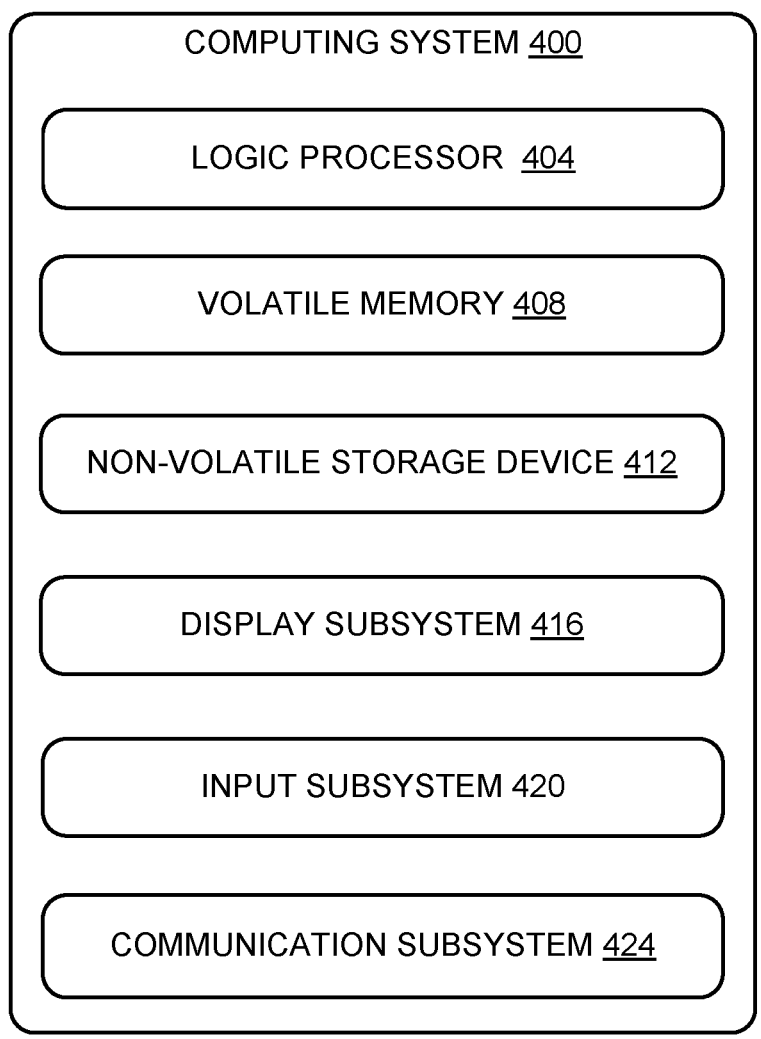
FIG. 12 is a block diagram of an example computing system according to examples of the present disclosure.

FIG. 12 schematically shows a non-limiting embodiment of a computing system 400 shown in simplified form. Computing system 400 may take the form of one or more computing devices such as personal computers, laptop computers, desktop computers, all-in-one displays, tablet computers, home-entertainment computers, gaming devices or consoles, mobile computing devices, mobile communication devices (e.g., smart phones), and/or other computing devices, styli, headphones or earbuds, head-mounted displays or eyeglasses, or other input devices. In the above examples, computing device 100 and stylus 154 may comprise computing system 400 or one or more aspects of computing system 400.

Computing system 400 includes a logic processor 404, volatile memory 408, and a non-volatile storage device 412. Computing system 400 may optionally include a display sub system 416, input sub system 420, communication sub system 424, and/or other components not shown in FIG. 12.

Logic processor 404 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 404 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 404 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 408 may include physical devices that include random access memory. Volatile memory 408 is typically utilized by logic processor 404 to temporarily store information during processing of software instructions. It will be appreciated that volatile memory 408 typically does not continue to store instructions when power is cut to the volatile memory 408.

Non-volatile storage device 412 includes one or more physical devices configured to hold instructions executable by the logic processors to implement the methods and processes described herein. When such methods and processes are implemented, the state of non-volatile storage device 412 may be transformed—e.g., to hold different data.

Non-volatile storage device 412 may include physical devices that are removable and/or built-in. Non-volatile storage device 412 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 412 may include nonvolatile, dynamic, static, read/write, read-only, sequential-access, location-addressable, file-addressable, and/or content-addressable devices. It will be appreciated that non-volatile storage device 412 is configured to hold instructions even when power is cut to the non-volatile storage device 412.

Aspects of logic processor 404, volatile memory 408, and non-volatile storage device 412 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 416 may be used to present a visual representation of data held by non-volatile storage device 412. As the herein described methods and processes change the data held by the non-volatile storage device, and thus transform the state of the non-volatile storage device, the state of display subsystem 416 may likewise be transformed to visually represent changes in the underlying data. Display subsystem 416 may include one or more display devices utilizing virtually any type of technology. Such display devices may be combined with logic processor 404, volatile memory 408, and/or non-volatile storage device 412 in a shared enclosure, or such display devices may be peripheral display devices.

When included, input subsystem 420 may comprise or interface with one or more user-input devices such as a stylus, touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 424 may be configured to communicatively couple various computing devices described herein with each other, and with other devices. Communication subsystem 424 may include wired and/or wireless communication devices compatible with one or more different communication protocols. As non-limiting examples, the communication subsystem may be configured for communication via electrostatic voltage antennas, near-field communication (NFC) protocols, wireless telephone network, or a wired or wireless personal-, local- or wide-area network, such as Bluetooth or an HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a computing device configured to removably attach a component, the computing device comprising: a housing comprising: a first device electromagnet; a second device electromagnet spaced from the first device electromagnet; and a wireless charging transmitting antenna between the first device electromagnet and the second device electromagnet; a processor; and a memory storing instructions executable by the processor to: synchronize a first device current through the first device electromagnet of the computing device with a first component current through a first component electromagnet of the component to attract the first device electromagnet to the first component electromagnet; and synchronize a second device current through the second device electromagnet of the computing device with a second component current through a second component electromagnet of the component to attract the second device electromagnet to the second component electromagnet. The computing device may additionally or alternatively include, wherein the first device electromagnet and the second device electromagnet each comprise: an elongated permanent magnet; a soft magnet comprising an elongated body and an end portion that at least partially enclose the elongated permanent magnet; and a coil winding around the elongated body of the soft magnet. The computing device may additionally or alternatively include, wherein the end portion is a first end portion, and the soft magnet comprises a second end portion spaced from the first end portion to form a U-shaped structure that at least partially encloses the elongated permanent magnet. The computing device may additionally or alternatively include, wherein the first device electromagnet comprises: a plurality of elongated permanent magnets arranged end-to-end; a soft magnet comprising: an elongated body; a first end portion extending from the elongated body; and a second end portion spaced from the first end portion and extending from the elongated body to form a U-shaped structure that at least partially encloses the plurality of elongated permanent magnets; and a coil winding around the elongated body of the soft magnet and extending adjacent to the plurality of elongated permanent magnets. The computing device may additionally or alternatively include, wherein a single circuit controls the first device current through the first device electromagnet. The computing device may additionally or alternatively include, wherein the instructions are executable to: reverse either (1) the first device current through the first device electromagnet or (2) the first component current through the first component electromagnet to repel the first device electromagnet from the first component electromagnet; and reverse either (1) the second device current through the second device electromagnet or (2) the second component current through the second component electromagnet to repel the second device electromagnet from the second component electromagnet. The computing device may additionally or alternatively include, wherein synchronizing the first device current with the first component current comprises causing current flow in a first direction in the first device electromagnet and causing current flow in a second direction opposite to the first direction in the first component electromagnet. The computing device may additionally or alternatively include, wherein the instructions are executable to: determine that a predetermined time period after starting the current flow through the first device electromagnet has expired, and on condition that predetermined time period has expired, stop the current flow through the first device electromagnet. The computing device may additionally or alternatively include, wherein the instructions are executable to: monitor a wireless charging efficiency via the wireless charging transmitting antenna and the wireless charging receiving antenna; and on condition that the wireless charging efficiency reaches an attachment efficiency threshold, stop the current flow through the first device electromagnet. The computing device may additionally or alternatively include, wherein the instructions are executable to: determine a wireless charging efficiency via the wireless charging transmitting antenna and the wireless charging receiving antenna; and based at least in part on the wireless charging efficiency, select a selected current magnitude from a plurality of current magnitudes for the first device current. The computing device may additionally or alternatively include, wherein selecting the selected current magnitude comprises: on condition that the wireless charging efficiency is greater than a misalignment efficiency threshold, select a first selected current magnitude; and on condition that the wireless charging efficiency is less than or equal to the misalignment efficiency threshold, select a second selected current magnitude that is greater than the first selected current magnitude.

Another aspect provides a method of removably attaching a component to a computing device, the computing device comprising a first device electromagnet, a second device electromagnet, and a wireless charging transmitting antenna, the component comprising a first component electromagnet, a second component electromagnet, and a wireless charging receiving antenna, the method comprising: synchronizing a first device current through the first device electromagnet of the computing device with a first component current through the first component electromagnet of the component to attract the first device electromagnet to the first component electromagnet; and synchronizing a second device current through the second device electromagnet of the computing device with a second component current through the second component electromagnet of the component to attract the second device electromagnet to the second component electromagnet. The method may additionally or alternatively include reversing either (1) the first device current through the first device electromagnet or (2) the first component current through the first component electromagnet to repel the first device electromagnet from the first component electromagnet; and reversing either (1) the second device current through the second device electromagnet or (2) the second component current through the second component electromagnet to repel the second device electromagnet from the second component electromagnet. The method may additionally or alternatively include, wherein synchronizing the first device current with the first component current comprises causing current flow in a first direction in the first device electromagnet and causing current flow in a second direction opposite to the first direction in the first component electromagnet. The method may additionally or alternatively include determining that a predetermined time period after starting the current flow through the first device electromagnet has expired, and on condition that predetermined time period has expired, stopping the current flow through the first device electromagnet. The method may additionally or alternatively include monitoring a wireless charging efficiency via the wireless charging transmitting antenna and the wireless charging receiving antenna; and on condition that the wireless charging efficiency reaches an attachment efficiency threshold, stopping the current flow through the first device electromagnet. The method may additionally or alternatively include determining a wireless charging efficiency via the wireless charging transmitting antenna and the wireless charging receiving antenna; and based at least in part on the wireless charging efficiency, selecting a selected current magnitude from a plurality of current magnitudes for the first device current. The method may additionally or alternatively include, wherein selecting the selected current magnitude comprises: on condition that the wireless charging efficiency is greater than a misalignment efficiency threshold, selecting a first selected current magnitude; and on condition that the wireless charging efficiency is less than or equal to the misalignment efficiency threshold, selecting a second selected current magnitude that is greater than the first selected current magnitude.

Another aspect provides a removable component configured for removable attachment to a computing device, the removable component comprising: an enclosure comprising: a first component electromagnet; a second component electromagnet spaced from the first component electromagnet; and a wireless charging receiving antenna between the first component electromagnet and the second component electromagnet; a processor; and a memory storing instructions executable by the processor to: synchronize a first component current through the first component electromagnet with a first device current through a first device electromagnet of the computing device to attract the first component electromagnet to the first device electromagnet; and synchronize a second component current through the second component electromagnet with a second device current through a second device electromagnet of the computing device to attract the second component electromagnet to the second device electromagnet. The removable component may additionally or alternatively include, wherein the first component electromagnet comprises: a plurality of elongated permanent magnets arranged end-to-end; a soft magnet comprising: an elongated body; a first end portion extending from the elongated body; and a second end portion spaced from the first end portion and extending from the elongated body to form a U-shaped structure that at least partially encloses the plurality of elongated permanent magnets; and a coil winding around the elongated body of the soft magnet and extending adjacent to the plurality of elongated permanent magnets.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various processes, systems and configurations, and other features, functions, acts, and/or properties disclosed herein, as well as any and all equivalents thereof.

The claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure. As used herein, the phrase "and/or" means any or all of multiple stated possibilities.

The invention claimed is:

1. A computing device configured to removably attach a component, the computing device comprising:
    a housing comprising:
        a first device electromagnet;
        a second device electromagnet spaced from the first device electromagnet; and
        a wireless charging transmitting antenna between the first device electromagnet and the second device electromagnet;
    a processor; and
    a memory storing instructions executable by the processor to:
        synchronize a first device current through the first device electromagnet of the computing device with a first component current through a first component electromagnet of the component to attract the first device electromagnet to the first component electromagnet; and
        synchronize a second device current through the second device electromagnet of the computing device with a second component current through a second component electromagnet of the component to attract the second device electromagnet to the second component electromagnet.

2. The computing device of claim 1, wherein the first device electromagnet and the second device electromagnet each comprise:
    an elongated permanent magnet;
    a soft magnet comprising an elongated body and an end portion that at least partially enclose the elongated permanent magnet; and
    a coil winding around the elongated body of the soft magnet.

3. The computing device of claim 2, wherein the end portion is a first end portion, and the soft magnet comprises a second end portion spaced from the first end portion to form a U-shaped structure that at least partially encloses the elongated permanent magnet.

4. The computing device of claim 1, wherein the first device electromagnet comprises:
    a plurality of elongated permanent magnets arranged end-to-end;
    a soft magnet comprising:
        an elongated body;
        a first end portion extending from the elongated body; and
        a second end portion spaced from the first end portion and extending from the elongated body to form a U-shaped structure that at least partially encloses the plurality of elongated permanent magnets; and
    a coil winding around the elongated body of the soft magnet and extending adjacent to the plurality of elongated permanent magnets.

5. The computing device of claim 4, wherein a single circuit controls the first device current through the first device electromagnet.

6. The computing device of claim 1, wherein the instructions are executable to:
    reverse either (1) the first device current through the first device electromagnet or (2) the first component current through the first component electromagnet to repel the first device electromagnet from the first component electromagnet; and
    reverse either (1) the second device current through the second device electromagnet or (2) the second component current through the second component electromagnet to repel the second device electromagnet from the second component electromagnet.

7. The computing device of claim 1, wherein synchronizing the first device current with the first component current comprises causing current flow in a first direction in the first device electromagnet and causing current flow in a second direction opposite to the first direction in the first component electromagnet.

8. The computing device of claim 1, wherein the instructions are executable to:
  determine that a predetermined time period after starting the current flow through the first device electromagnet has expired, and
  on condition that predetermined time period has expired, stop the current flow through the first device electromagnet.

9. The computing device of claim 1, wherein the instructions are executable to:
  monitor a wireless charging efficiency via the wireless charging transmitting antenna and the wireless charging receiving antenna; and
  on condition that the wireless charging efficiency reaches an attachment efficiency threshold, stop the current flow through the first device electromagnet.

10. The computing device of claim 1, wherein the instructions are executable to:
  determine a wireless charging efficiency via the wireless charging transmitting antenna and the wireless charging receiving antenna; and
  based at least in part on the wireless charging efficiency, select a selected current magnitude from a plurality of current magnitudes for the first device current.

11. The computing device of claim 10, wherein selecting the selected current magnitude comprises:
  on condition that the wireless charging efficiency is greater than a misalignment efficiency threshold, select a first selected current magnitude; and
  on condition that the wireless charging efficiency is less than or equal to the misalignment efficiency threshold, select a second selected current magnitude that is greater than the first selected current magnitude.

12. A method of removably attaching a component to a computing device, the computing device comprising a first device electromagnet, a second device electromagnet, and a wireless charging transmitting antenna, the component comprising a first component electromagnet, a second component electromagnet, and a wireless charging receiving antenna, the method comprising:
  synchronizing a first device current through the first device electromagnet of the computing device with a first component current through the first component electromagnet of the component to attract the first device electromagnet to the first component electromagnet; and
  synchronizing a second device current through the second device electromagnet of the computing device with a second component current through the second component electromagnet of the component to attract the second device electromagnet to the second component electromagnet.

13. The method of claim 12, further comprising:
  reversing either (1) the first device current through the first device electromagnet or (2) the first component current through the first component electromagnet to repel the first device electromagnet from the first component electromagnet; and
  reversing either (1) the second device current through the second device electromagnet or (2) the second component current through the second component electromagnet to repel the second device electromagnet from the second component electromagnet.

14. The method of claim 12, wherein synchronizing the first device current with the first component current comprises causing current flow in a first direction in the first device electromagnet and causing current flow in a second direction opposite to the first direction in the first component electromagnet.

15. The method of claim 12, further comprising:
  determining that a predetermined time period after starting the current flow through the first device electromagnet has expired, and
  on condition that predetermined time period has expired, stopping the current flow through the first device electromagnet.

16. The method of claim 12, further comprising:
  monitoring a wireless charging efficiency via the wireless charging transmitting antenna and the wireless charging receiving antenna; and
  on condition that the wireless charging efficiency reaches an attachment efficiency threshold, stopping the current flow through the first device electromagnet.

17. The method of claim 12, further comprising:
  determining a wireless charging efficiency via the wireless charging transmitting antenna and the wireless charging receiving antenna; and
  based at least in part on the wireless charging efficiency, selecting a selected current magnitude from a plurality of current magnitudes for the first device current.

18. The method of claim 17, wherein selecting the selected current magnitude comprises:
  on condition that the wireless charging efficiency is greater than a misalignment efficiency threshold, selecting a first selected current magnitude; and
  on condition that the wireless charging efficiency is less than or equal to the misalignment efficiency threshold, selecting a second selected current magnitude that is greater than the first selected current magnitude.

19. A removable component configured for removable attachment to a computing device, the removable component comprising:
  an enclosure comprising:
    a first component electromagnet;
    a second component electromagnet spaced from the first component electromagnet; and
    a wireless charging receiving antenna between the first component electromagnet and the second component electromagnet;
  a processor; and
  a memory storing instructions executable by the processor to:
    synchronize a first component current through the first component electromagnet with a first device current through a first device electromagnet of the computing device to attract the first component electromagnet to the first device electromagnet; and
    synchronize a second component current through the second component electromagnet with a second device current through a second device electromagnet of the computing device to attract the second component electromagnet to the second device electromagnet.

20. The removable component of claim 19, wherein the first component electromagnet comprises:
  a plurality of elongated permanent magnets arranged end-to-end;
  a soft magnet comprising:
    an elongated body;
    a first end portion extending from the elongated body; and
    a second end portion spaced from the first end portion and extending from the elongated body to form a U-shaped structure that at least partially encloses the plurality of elongated permanent magnets; and
a coil winding around the elongated body of the soft magnet and extending adjacent to the plurality of elongated permanent magnets.

* * * * *